United States Patent [19]

Takatori et al.

[11] Patent Number: 4,500,999
[45] Date of Patent: Feb. 19, 1985

[54] LINE EQUALIZER

[75] Inventors: Hiroshi Takatori, Kokubunji; Toshiro Suzuki, Tama, both of Japan

[73] Assignee: Hitachi, Ltd., Tokyo, Japan

[21] Appl. No.: 444,227

[22] Filed: Nov. 24, 1982

[30] Foreign Application Priority Data

Nov. 27, 1981 [JP] Japan .............................. 56-189341

[51] Int. Cl.$^3$ .............................................. H04B 3/14
[52] U.S. Cl. ........................................ 375/16; 333/18;
333/28 R
[58] Field of Search ....................... 375/12, 14, 15, 16;
333/18, 28 R, 174; 178/69 M, 69 A, 69 B, 69 H;
179/2 DP

[56] References Cited

U.S. PATENT DOCUMENTS

| | | | |
|---|---|---|---|
| 3,775,688 | 11/1973 | Hinoshita et al. | 375/17 X |
| 3,879,664 | 4/1975 | Monsen | 375/14 |
| 4,253,184 | 2/1981 | Gitlin et al. | 375/14 |
| 4,298,983 | 11/1981 | Kawai et al. | 375/12 |
| 4,388,724 | 6/1983 | Göckler | 375/14 |
| 4,422,175 | 12/1983 | Bingham et al. | 375/14 |

Primary Examiner—Robert L. Griffin
Assistant Examiner—Raymond C. Glenny
Attorney, Agent, or Firm—Antonelli, Terry & Wands

[57] ABSTRACT

A line equalizer including a $\sqrt{f}$ equalizer for compensating a $\sqrt{f}$-characteristic of a transmission line, a BT equalizer connected in series with the $\sqrt{f}$ equalizer for removing an echo component caused by a bridged tap (namely, BT) on the transmission line, and a circuit for controlling the $\sqrt{f}$ equalizer is disclosed. A signal applied to the $\sqrt{f}$ equalizer is subjected to over-equalization to make the time domain length of impulse response at the output of the $\sqrt{f}$ equalizer small. The equalization state of the output of the $\sqrt{f}$ equalizer is judged by signals formed in the BT equalizer, and the gain of the $\sqrt{f}$ equalizer is controlled on the basis of the result of judgement. In this manner, the $\sqrt{f}$ equalizer is controlled without suffering any interference between a control loop of the $\sqrt{f}$ equalizer and a control loop of the BT equalizer.

3 Claims, 6 Drawing Figures

LINE EQUALIZER

The present invention relates to a line equalizer, and more particularly to a line equalizer suitable for use in a transmission line having wide line length distribution and one or more branches (namely, echo paths) on a main signal path as in a digital telephone system.

In a transmission line such as an ordinary pair or co-axial cable, insertion loss is increased as the frequency of the signal is higher, that is, a $\sqrt{f}$-characteristic is generated, due to the skin effect of the line. Accordingly, in the case where a signal is transmitted by such a line, an equalizer having a characteristic opposite to the $\sqrt{f}$-characteristic (that is, a $\sqrt{f}$ equalizer) is provided in a repeater or the input part of a receiver to compensate the $\sqrt{f}$-characteristic, thereby obtaining a flat frequency characteristic. Further, in the case where the $\sqrt{}$-characteristic varies with line length or environmental conditions, a variable equalizer is employed in place of the above equalizer, and variations in the $\sqrt{f}$-characteristic are detected to control the characteristic of the variable equalizer.

On the other hand, in a telephone system, a main path is provided with one or more branch paths or bridged taps (hereinafter simply referred to as "BT's") in order to prepare for an increase of subscriber's lines. A transmission line provided with a BT has a complicated transmission characteristic which cannot be compensated only by a $\sqrt{f}$ equalizer. Accordingly, another equalizer for use in a line provided with a BT (hereinafter simply referred to as a "BT equalizer") is added to the transmission line, together with the $\sqrt{f}$ equalizer. The BT equalizer is formed of an automatic equalizer for automatically generating an optimum transmission characteristic in accordance with the state of the BT. The line equalizer with the above-mentioned combination of the $\sqrt{f}$ equalizer and BT equalizer in the prior art has various problems. The first problem is that, since the $\sqrt{f}$ equalizer and BT equalizer are controlled by using independent detectors respectively, a control loop of the $\sqrt{f}$ equalizer and that of the BT equalizer interfere remarkably with each other, and therefore intersymbol interference is increased. In more detail, the problem is that an offset of a peak detector for controlling the $\sqrt{f}$ equalizer and a reference voltage error in a control system of the peak detector increase a variation in the characteristic of a tap loop of the BT equalizer.

The second problem is that, when two or more BT's each having a length of 300 to 400 m are provided on a main path, the BT equalizer becomes complicated in structure and expensive, since the time domain length of impulse response is large. That is, in such a BT equalizer (namely, an automatic equalizer), a plurality of delay elements corresponding to the time domain length of impulse response are connected in series, and the tap output of each delay element is multiplied by a constant to obtain the sum of products thus formed. Accordingly, the number of taps and the number of multipliers for multiplying the tap outputs by the constant are increased as the time domain length of impulse response becomes larger.

The third problem is that it causes not only a convergence of tap coefficients of the BT equalizer to be difficult but also timing extraction and other operations to be disturbed greatly. The reason for this is that the peak of an echo depending on the BT becomes larger than that of an original main pulse when four or more BTs each producing a maximum insertion loss in the vicinity of the Nyquist frequency of signal to be transmitted are provided on a main path.

A main object of the present invention is to eliminate the interference between a control loop of a $\sqrt{f}$ equalizer and a control loop of a BT equalizer, and to reduce the intersymbol interference.

Another object of the present invention is to reduce the time domain length of impulse response at an output signal from a $\sqrt{f}$ equalizer to reduce the number of taps and the number of multipliers included in a BT equalizer, thereby simplifying the structure thereof.

A further object of the present invention is to provide a line equalizer in which an echo peak resulting from a BT is prevented from exceeding a main pulse, and tap coefficients of a BT equalizer readily converge.

In order to attain the above objects, according to the present invention, there is provided a line equalizer in which a $\sqrt{f}$ equalizer for compensating a $\sqrt{f}$-characteristic of a transmission line is connected in series with a BT equalizer for compensating an echo component of impulse response resulting from a bridged tap. An automatic control circuit for controlling the $\sqrt{f}$ equalizer is made up of a first circuit for judging the equalization operation of the $\sqrt{f}$ equalizer by using an internal signal of the BT equalizer and a second circuit for converting the output of the first circuit into a control signal for controlling the $\sqrt{f}$ equalizer.

In a preferred embodiment of the present invention, the above-mentioned BT equalizer includes a subtracter for subtracting the output of an echo detecting circuit which will be described later, from the output of the $\sqrt{f}$ equalizer, a decision circuit for discriminating codes of a data signal (for example, discriminating between levels of "1" and "0" when the data signal is coded with a binary code, or discriminating among level of "+1", "0" and "−1" when the data signal is coded with a bipolar code) from the level of an output signal of the subtracter, an equalization error detecting circuit for detecting an equalization error from the outputs of the decision circuit and subtracter, and an echo detecting circuit for generating an echo component from the outputs of the decision circuit and equalization error detecting circuit. Further, the control signal for controlling the $\sqrt{f}$ equalizer is formed from the outputs of the equalization error detecting circuit and decision circuit.

A line equalizer having the above-mentioned structure according to the present invention is simple in circuit configuration since the control signal for the $\sqrt{f}$ equalizer and the control signal for the BT equalizer are made of the same signals. Further, in this line equalizer, interference between respective control loops of the $\sqrt{f}$ equalizer and BT equalizer is decreased, and therefore the intersymbol interference is reduced. Accordingly, interference in the BT equalizer caused by the offset of a peak detector which has hitherto been required for controlling the $\sqrt{f}$ equalizer, and an error of the reference voltage used in a control circuit for controlling the peak detector can be eliminated.

The above-mentioned and other objects and features of the present invention will become more apparent by reference to the following description taken in conjunction with the accompanying drawings, in which.

Now, the present invention will be explained below in detail, on the basis of an embodiment thereof.

Figure 1:
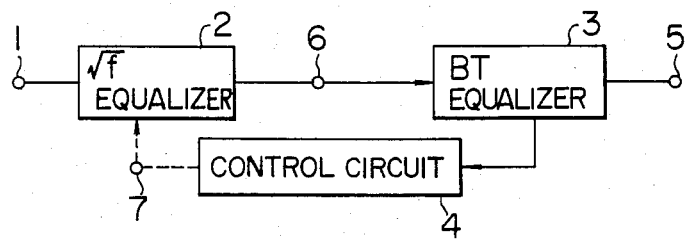
FIGS. 1 and 4 are a block diagram and a schematic circuit diagram, showing a construction of an embodiment of a line equalizer according to the present invention.

FIG. 1 shows, in block diagram form the circuit configuration of an embodiment of a line equalizer according to the present invention. An input signal which is extremely distorted due to a $\sqrt{}$-characteristic of a main path and a distortion characteristic of a BT connected thereto, is applied to a $\sqrt{f}$ equalizer 2 through an input terminal 1. The $\sqrt{f}$ equalizer 2 is controlled by a $\sqrt{f}$ over-equalization control circuit 4 so that the input signal is put in an appropriate $\sqrt{f}$ over-equalization state. The output of the $\sqrt{f}$ equalizer 2 is applied to a BT equalizer 3.

Figure 2:
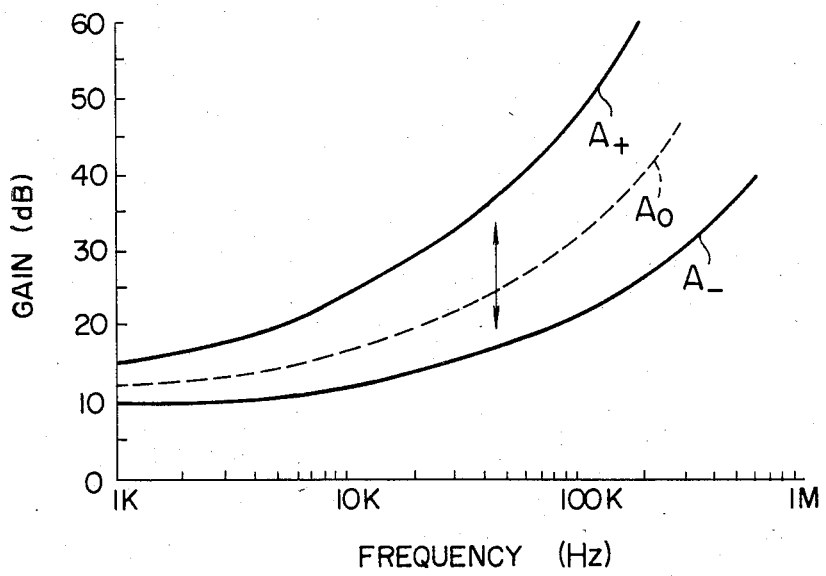
FIG. 2 is a graph showing frequency characteristics of the $\sqrt{f}$ equalizer shown in FIGS. 1 and 4.

The $\sqrt{f}$ equalizer 2 may be, for example, a well-known, Bode-type equalizer or a modified version thereof. The gain of the $\sqrt{f}$ equalizer varies in proportion to the square root of signal frequency as indicated by a broken line $A_o$ in FIG. 2, and this gain-$\sqrt{f}$ characteristic is varied between solid lines $A+$ and $A-$ by the control circuit 4 as centered on the line $A_o$.

Figure 3:
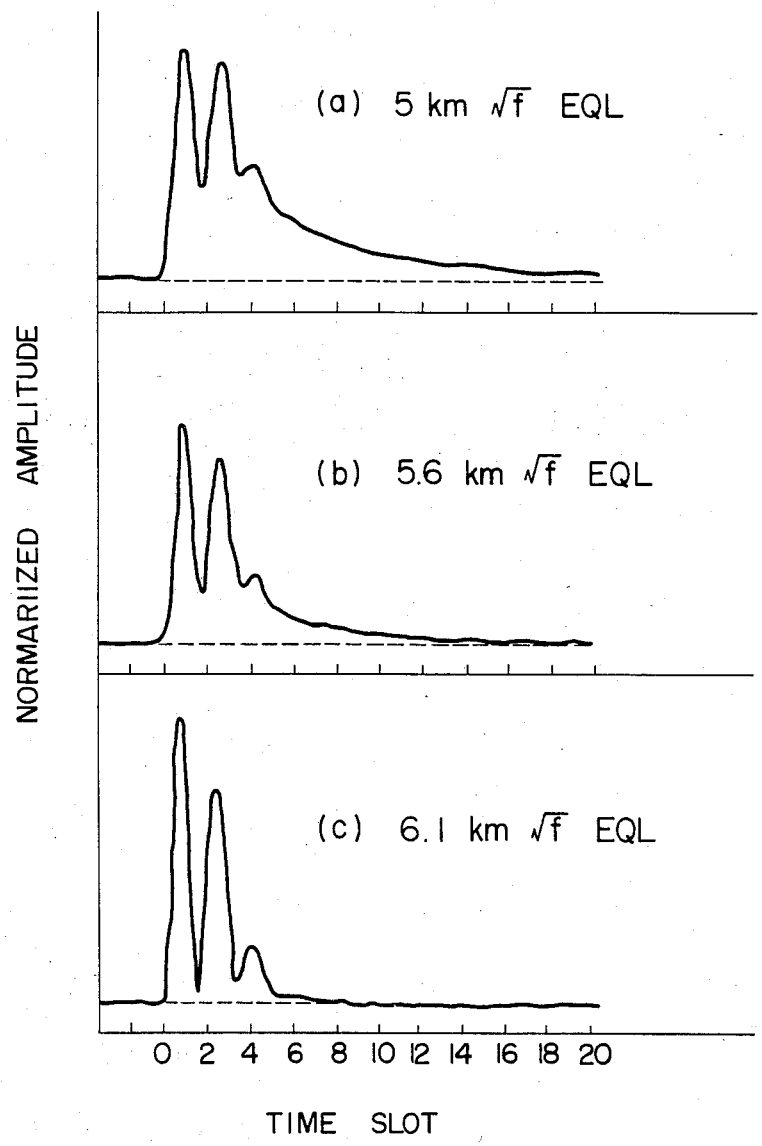
FIGS. 3 and 5 are waveform charts showing output waveforms from $\sqrt{f}$ equalizers.

FIG. 3 shows impulse responses in each case where an equalization is carried out to a pair cable 5 km long and 0.4 mm in diameter used for subscriber loops by a $\sqrt{f}$ equalizer for (a) a 5 km long pair cable, (b) a 5.6 km long pair cable and (c) a 6.1 km pair cable respectively. In this case, four BT's each having a length of 500 m are connected to the pair cable having a length of 5 km at regular intervals. That is, the equalizers (a), (b) and (c) for lines which are equal to or longer than the actual line in length, are used to carry out equalization. The $\sqrt{f}$ equalization using such equalizers (a), (b) and (c) for lines which are longer than an actual line (hereinafter simply referred to as "$\sqrt{f}$ over-equalization") makes short the time domain length of impulse response and makes small a ratio of the height of an echo peak to the height of a main pulse, as shown in FIG. 3.

The BT equalizer 3 not only carries out equalization so that an echo resulting from a BT is completely removed, but also compensates an equalization error caused by the $\sqrt{f}$ equalizer. (In the case where a main path is formed by connecting different kinds of cables in series, it is impossible to completely compensate the $\sqrt{f}$-characteristic of the main path by a $\sqrt{f}$ equalizer even if no BT is connected to the main path. The term "equalization error" indicates the failure of equalization in the above case.)

The $\sqrt{f}$ over-equalization control circuit 4 judges on the basis of the internal state of the BT equalizer whether $\sqrt{f}$ equalization is carried out in an optimum manner or not. The result of judgment is fed back to the $\sqrt{f}$ equalizer, and therefore the interference between the control loop of the $\sqrt{f}$ equalizer and the tap loop of the BT equalizer can be made small.

Figure 4:
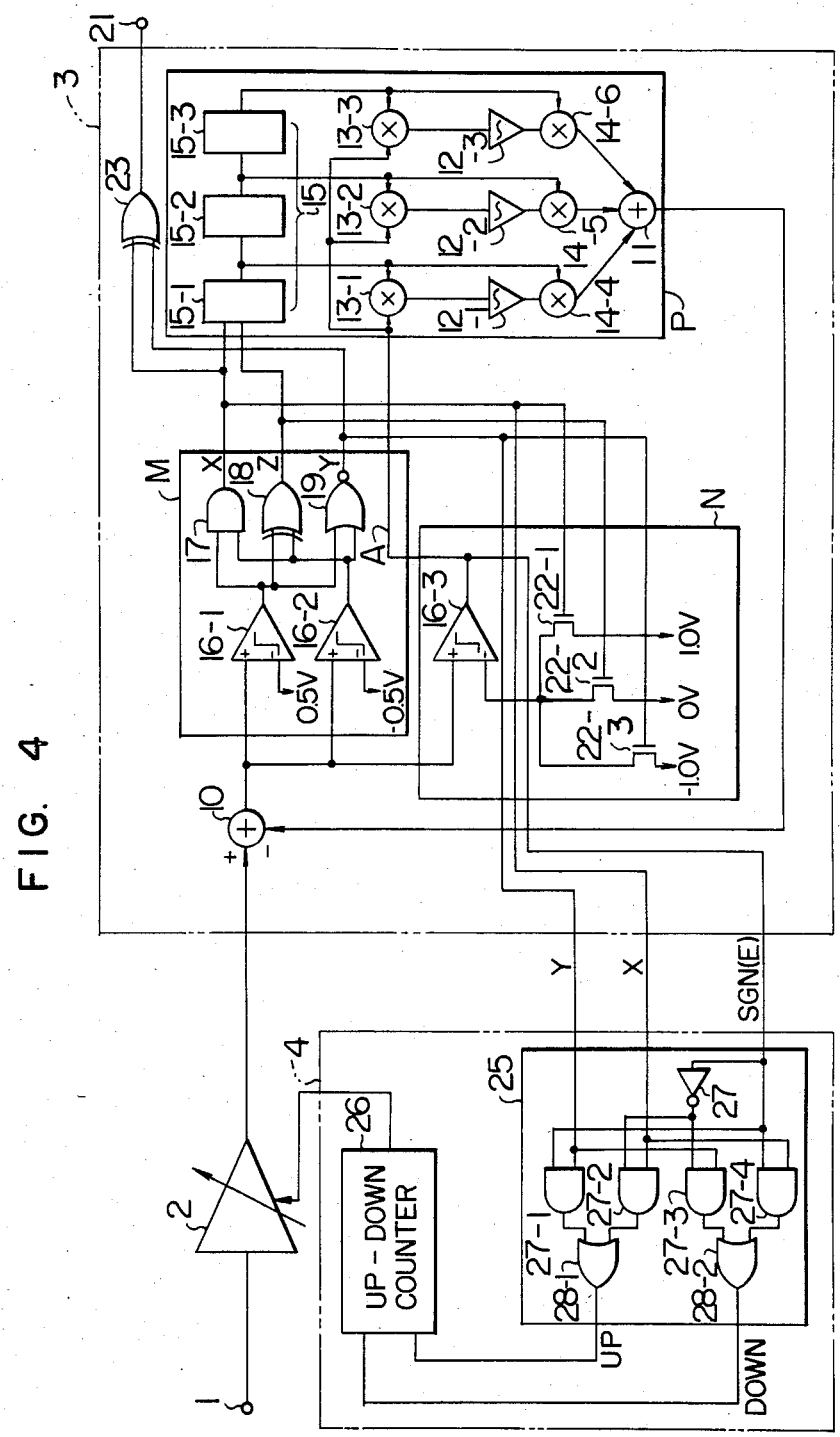

FIG. 4 is a schematic circuit diagram showing the circuit configuration of the embodiment shown in FIG. 1, in more detail. In FIGS. 1 and 4, like reference numerals designate like circuit parts. Since a well-known equalizer can be used as the $\sqrt{f}$ equalizer 2, detailed explanation thereof is omitted.

Figure 5:
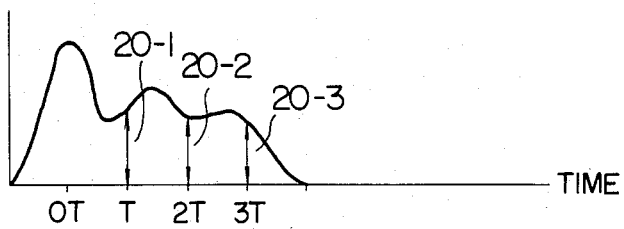
Figure 6:
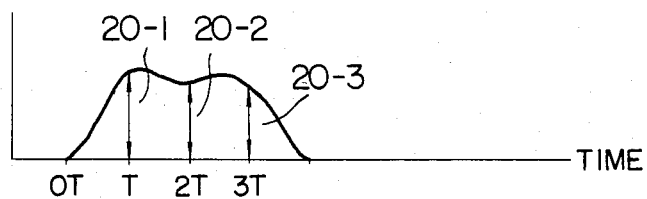
FIG. 6 is a waveform chart showing an output waveform from the adder 11 shown in FIG. 4.

Referring to FIG. 4, an impulse response signal outputted from the $\sqrt{f}$ equalizer 2 is applied to a subtracter 10 in the BT equalizer 3, to subtract an output signal of an echo detecting circuit P from the impulse response signal. FIG. 5 shows a waveform of the signal outputted from the $\sqrt{f}$ equalizer 2. In FIG. 5, a signal portion having a peak at a time moment OT indicates a main pulse, and signal portions having amplitudes 20-1, 20-2 and 20-3 at time moments T, 2T and 3T indicate echo components. Such echo components as shown in FIG. 6 are formed by the echo detecting circuit P, which will be explained later, and supplied to the subtracter 10. Accordingly, the output of the subtracter 10 does not contain components causing intersymbol interference, but contains only the main pulse. The output of the subtracter 10 is applied to a decision circuit M, to discriminate between codes of data signal. The decision circuit M is made up of comparators 16-1 and 16-2, an AND gate 17, an EXCLUSIVE-OR gate 18 and an NOR gate 19. In the present embodiment, input data is given in the form of a bipolar code having peak values $V_{op}$ of $\pm 1$ V. Accordingly, the threshold levels at the comparators 16-1 and 16-2 are set to $+0.5$ V and $-0.5$ V, respectively, and the voltage range of the bipolar code is divided by the logic circuits 17, 18 and 19 into three parts, that is, a first part not less than 0.5 V (indicated by X=1), a second part not less than $-0.5$ V but less than 0.5 V (indicated by Z=1) and a third part less than $-0.5$ V (indicated by Y=1), to determine which of the three parts corresponds to the level of the input data. In more detail, when the voltage $V_p$ of the main pulse is not less than 0.5 V, the outputs of the comparators 16-1 and 16-2 take a logical value "1". When the voltage $V_p$ is not less than $-0.5$ V but less than 0.5 V, the output of the comparator 16-1 and that of the comparator 16-2 take logical values "1" and "0", respectively. When the voltage $V_p$ is less than $-0.5$ V, the outputs of the comparators 16-1 and 16-2 take the logical value "0". As shown in FIG. 4, the outputs of the comparators 16-1 and 16-2 are applied to each of the AND gate 17, EXCLUSIVE-OR gate 18 and NOR gate 19, which deliver outputs X, Z and Y, respectively. Accordingly, when the voltage $V_p$ is not less than 0.5 V, that is, the input data has a code level of "1" in a bipolar code, the output X takes a level of "1". When the voltage $V_p$ is not less than $-0.5$ V but less than 0.5 V, that is, the input data takes a code level of "0", the output Z takes a level of "1". When the voltage $V_p$ is less than $-0.5$ V, that is, the input data indicates a code level of "$-1$", the output Y takes a level of "1".

An equalization error detecting circuit N is used to judge the polarity of the equalization error. In this circuit, the outputs X, Z and Y make and break switches 21-1, 22-2 and 22-3, respectively, to compare the output of the subtracter 10, that is, the result of equalization with a normal level (which is equal to 1, 0 or $-1$ V according as the level of "1" is obtained at the output X, Z or Y) by a comparator 16-3. That is, the switches 22-1, 22-2 and 22-3 act a coefficient circuit. The comparator 16-3 delivers an equalization error signal A (hereinafter designated by "sgn(e)").

As mentioned previously, the echo detecting circuit P is used to form the echo components shown in FIG. 6 on the basis of the signals sgn(e), X, Y and Z. The outputs X, Y and Z of the decision circuit M are applied to a shift register 15 which is formed by connecting delay elements 15-1, 15-2 and 15-3 in series. Signals taken out from taps of the shift register 15 are multiplied by those coefficients of variable coefficient circuits 12-1, 12-2 and 12-3 which are previously made equal to the amplitudes 20-1, 20-2 and 20-3 shown in FIG. 6 through the training method, by multipliers 14-4, 14-5 and 14-6, respectively, and products thus obtained are summed by an adder 11.

The above-mentioned circuit arrangement of the echo detecting circuit has been well known, and therefore detailed explanation thereof is omitted.

Further, according to the present invention, information for controlling the $\sqrt{f}$ equalizer 2 is formed using the output signals X and Y of the decision circuit and the equalization error signal sgn(e), each of which is the internal information of the BT equalizer 3. In other words, level information is formed by a logic circuit 25, and used as an input pulse of a counter 26 for controlling the gain of the $\sqrt{f}$ equalizer 2.

In more detail, the logic circuit 25 includes an AND gate 27-1 applied with the signals sgn(e) and Y, an AND gate 27-2 applied with the signal X and a signal $\overline{sgn}$)/ which is obtained by inverting the signal sgn(e) by an inverter 27, an AND gate 27-3 applied with the signals Y and $\overline{sgn}$)/, an AND gate 27-4 applied with the signals X and sgn(e), an OR gate 28-1 applied with the outputs of the AND gate 27-1 and 27-2, and an OR gate 28-2 applied with the outputs of the AND gate 27-3 and 27-4. When the logical values of the outputs of the OR gate 28-1 and 28-2 are expressed by U and D, respectively, the operation of the logic circuit 25 is given by the following logical expressions:

$$D = X \cdot sgn(e) + Y \cdot \overline{sgn})/, \quad U = X \cdot \overline{sgn})/ + Y \cdot sgn(e)$$

The output of the OR gate 28-2 indicated by the logical value D is used to form a down-pulse for a counter 26, and the output of the OR gate 28-1 indicated by the logical value U is used to form an up-pulse for the counter 26.

For example, let us consider the case where the signal X takes the level of "1", that is, a large positive pulse is outputted from the subtracter 10. When the signal sgn(e) takes the level of "1", it is indicated that the level of the outputted pulse is higher than the normal level 1 V, and therefore the down-pulse is sent out from the logic circuit 25. In contrast to the above-mentioned, when the signal sgn(e) takes the level of "0", the up-pulse is sent out.

As can be seen from the above-mentioned, the up- and down-pulses are sent out from the logical circuit 25 only when the signal X or Y takes the level of "1". When the signal Z takes the level of "1", the up- and down-pulses are not sent out. This is because the outputted pulses contains no level information.

These up- and down-pulses are subjected to appropriate filtering at the counter 26, and then used to control the $\sqrt{f}$ equalizer 2. The counter 26 is readily formed by both an ordinary up-down counter and a decoder, and therefore detailed explanation of the counter 26 is omitted.

It is to be understood that the above-mentioned circuit configuration has been shown only for the purpose of illustration and that various changes may be made in the details of the circuit and the combination and arrangement of circuit elements without departing from the spirit and scope of the invention.

What is claimed is:

1. A line equalizer comprising:
   a first equalizer for compensating a $\sqrt{f}$-characteristic of a transmission line;
   a second equalizer having a subtractor for subtracting an echo component from the output of said first equalizer;
   a decision circuit for discriminating code level of an equalized and coded signal outputted from said subtractor;
   an equalization error detecting circuit for detecting an equalization error on the basis of the outputs from said subtractor and said decision circuit;
   an echo detecting circuit for forming said echo component from the outputs of said decision circuit and said equalization error detecting circuit; and
   a control circuit for controlling gain of said first equalizer on the basis of signals obtained in said decision circuit and said equalization error detecting circuit of said second equalizer.

2. A line equalizer according to claim 1, wherein said coded signal is a bipolar code signal, wherein said decision circuit includes a first comparator for comparing the output of said subtracter with a second potential which is intermediate between zero potential and a first potential corresponding to a code level "1" of said bipolar code, a second comparator for comparing the output of said subtracter with a fourth potential which is intermediate between zero potential and a third potential corresponding to a code level "−1" of said bipolar code, an AND gate applied with the outputs of said first and second comparators, an EXCLUSIVE-OR gate applied with the outputs of said first and second comparators, and an NOR gate applied with the outputs of said first and second comparators, and wherein said equalization error detecting circuit includes switch means for setting a reference potential to one of said first, zero and third potentials in accordance with the outputs of said AND gate, EXCLUSIVE-OR gate and NOR gate, and a third comparator for comparing the output of said subtracter with said reference potential.

3. A line equalizer according to claim 2,
   wherein said control circuit includes first and second logic circuits in which the outputs of said AND gate, NOR gate and third comparator are added, and an up-down counter which counts down in accordance with the output of said first logic circuit and counts up in accordance with the output of said second logic circuit, and
   wherein the output of said first logic circuit takes a level of "1" when the outputs of said AND gate and third comparator take a level of "1" or when the output of said NOR gate and an inverted version of the output of said third comparator take a level of "1", and the output of said second logic circuit takes a level of "1" when the output of said AND gate and said inverted version of the output of said third comparator take a level of "1" or when the outputs of said NOR gate and third comparator take a level of "1".

* * * * *